United States Patent
Kumar et al.

(10) Patent No.: US 11,716,675 B2
(45) Date of Patent: Aug. 1, 2023

(54) ACQUIRING OSI FOR SON FROM MACRO 5G BASE STATION CONFIGURED WITH ON-DEMAND OSI

(71) Applicant: QUALCOMM Incorporated, San Diego, CA (US)

(72) Inventors: Satish Kumar, Hyderabad (IN); Sarath Pinayour Chandrasekaran, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 36 days.

(21) Appl. No.: 17/190,164

(22) Filed: Mar. 2, 2021

(65) Prior Publication Data

US 2022/0286944 A1 Sep. 8, 2022

(51) Int. Cl.
*H04W 48/14* (2009.01)
*H04W 48/16* (2009.01)
*H04W 74/08* (2009.01)
*H04W 72/23* (2023.01)

(52) U.S. Cl.
CPC .......... *H04W 48/14* (2013.01); *H04W 48/16* (2013.01); *H04W 72/23* (2023.01); *H04W 74/0833* (2013.01)

(58) Field of Classification Search
CPC ... H04W 48/14; H04W 48/16; H04W 72/042; H04W 72/23; H04W 74/0833; H04W 92/12; H04W 92/20
See application file for complete search history.

(56) References Cited

U.S. PATENT DOCUMENTS

| | | | |
|---|---|---|---|
| 2015/0056997 A1* | 2/2015 | Su | H04W 36/08 455/436 |
| 2016/0295607 A1* | 10/2016 | Vajapeyam | H04W 56/00 |
| 2018/0013524 A1* | 1/2018 | Chien | H04L 5/005 |
| 2018/0063878 A1* | 3/2018 | Amerga | H04W 72/0486 |
| 2019/0363843 A1* | 11/2019 | Gordaychik | H04W 52/58 |
| 2020/0029364 A1* | 1/2020 | Wang | H04W 74/0833 |
| 2020/0280395 A1* | 9/2020 | Ko | H04W 72/12 |
| 2021/0144742 A1* | 5/2021 | Jeon | H04W 52/50 |
| 2021/0251011 A1* | 8/2021 | You | H04W 74/0833 |
| 2021/0274554 A1* | 9/2021 | Cozzo | H04W 48/12 |
| 2021/0410011 A1* | 12/2021 | Hathiramani | H04W 68/02 |
| 2022/0085906 A1* | 3/2022 | Lovlekar | H04J 11/0076 |
| 2022/0095309 A1* | 3/2022 | MolavianJazi | H04W 56/001 |
| 2022/0132384 A1* | 4/2022 | Sitaram | H04W 36/08 |

* cited by examiner

*Primary Examiner* — Walli Z Butt
(74) *Attorney, Agent, or Firm* — Procopio, Cory, Hargreaves & Savitch LLP

(57) ABSTRACT

A first base station is disclosed. The first base station may transmit, to a second BS, at least one PRACH preamble for requesting OSI. The first base station may receive a PDCCH and an associated PDSCH, the PDSCH including the OSI. Prior to transmitting the at least one PRACH, the first base station may scan for neighboring BSs. The first base station may determine, based on first quality metrics associated with the neighboring BSs, a set of BSs, the set of BSs including the second BS. The first station may obtain a MIB and at least one SIB from each of the set of BSs. The at least one PRACH preamble may be transmitted to the second BS based on the obtained MIB and the at least one SIB from the second BS.

30 Claims, 7 Drawing Sheets

ACQUIRING OSI FOR SON FROM MACRO 5G BASE STATION CONFIGURED WITH ON-DEMAND OSI

BACKGROUND

Technical Field

The present disclosure relates generally to communication systems, and more particularly, to a base station in a 5G communication system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first base station (BS). The apparatus may transmit, to a second BS, at least one physical random access channel (PRACH) preamble for requesting other system information (OSI). The apparatus may receive a physical downlink control channel (PDCCH) and an associated physical downlink shared channel (PDSCH), the PDSCH including the OSI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
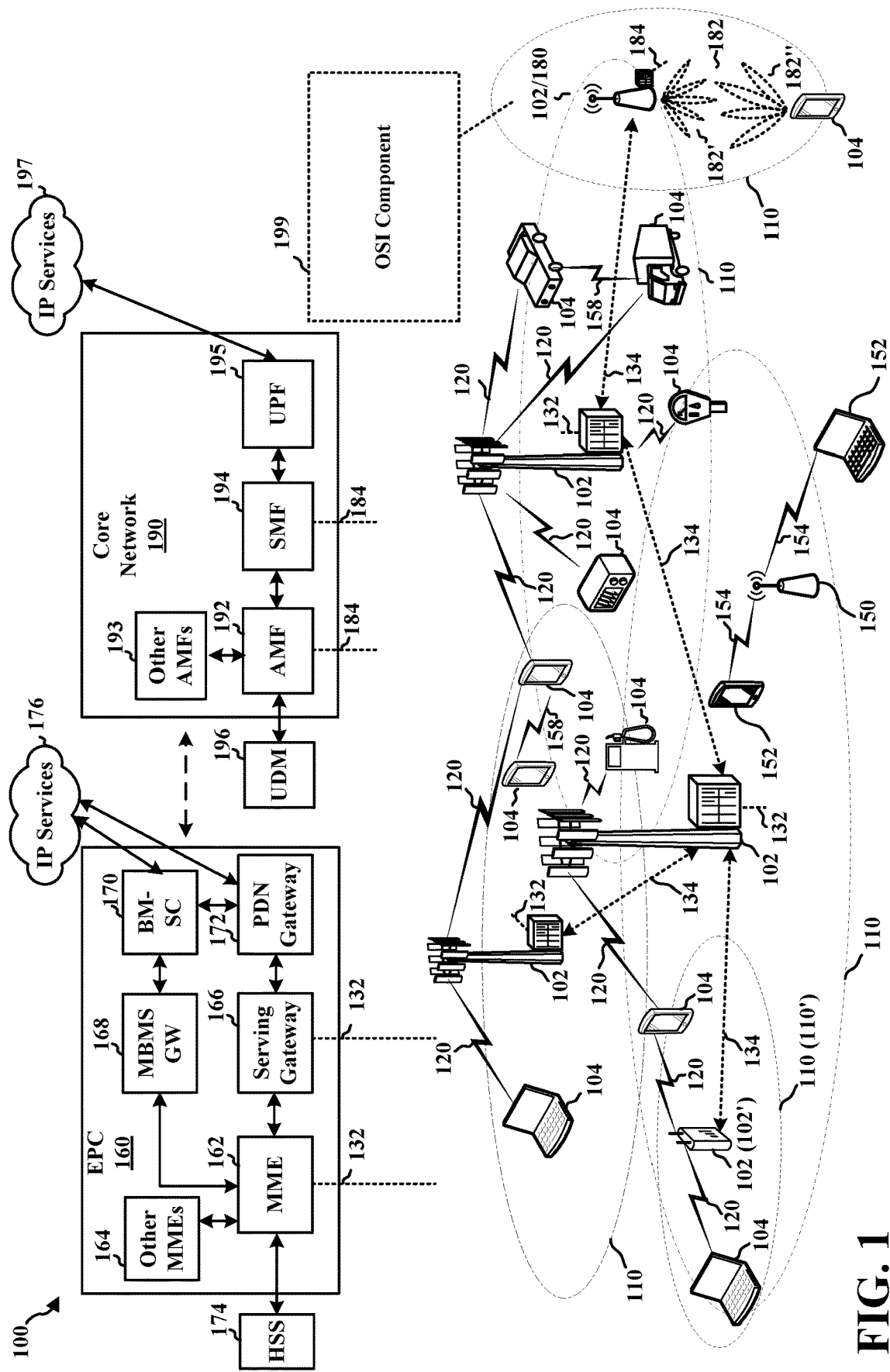
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the base station 180 may include an OSI component 199 that may be configured to transmit, to a second BS, at least one PRACH preamble for requesting other OSI. The OSI component 199 may be further configured to receive a PDCCH and an associated PDSCH, the PDSCH including the OSI. Although the following description may be focused on 5G NR, the concepts described herein may be applicable to other similar areas, such as LTE, LTE-A, CDMA, GSM, and other wireless technologies.

Figure 2:
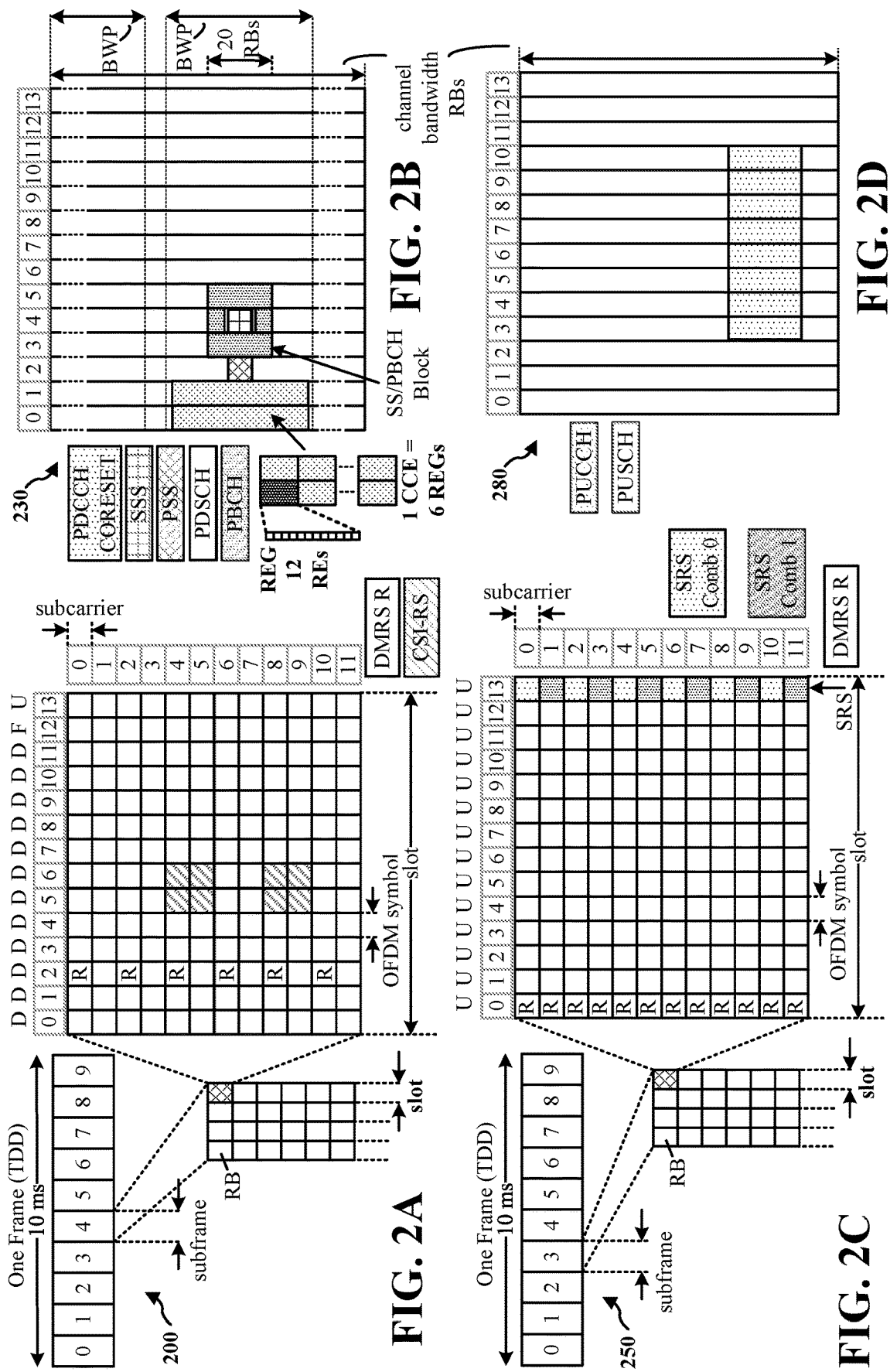
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
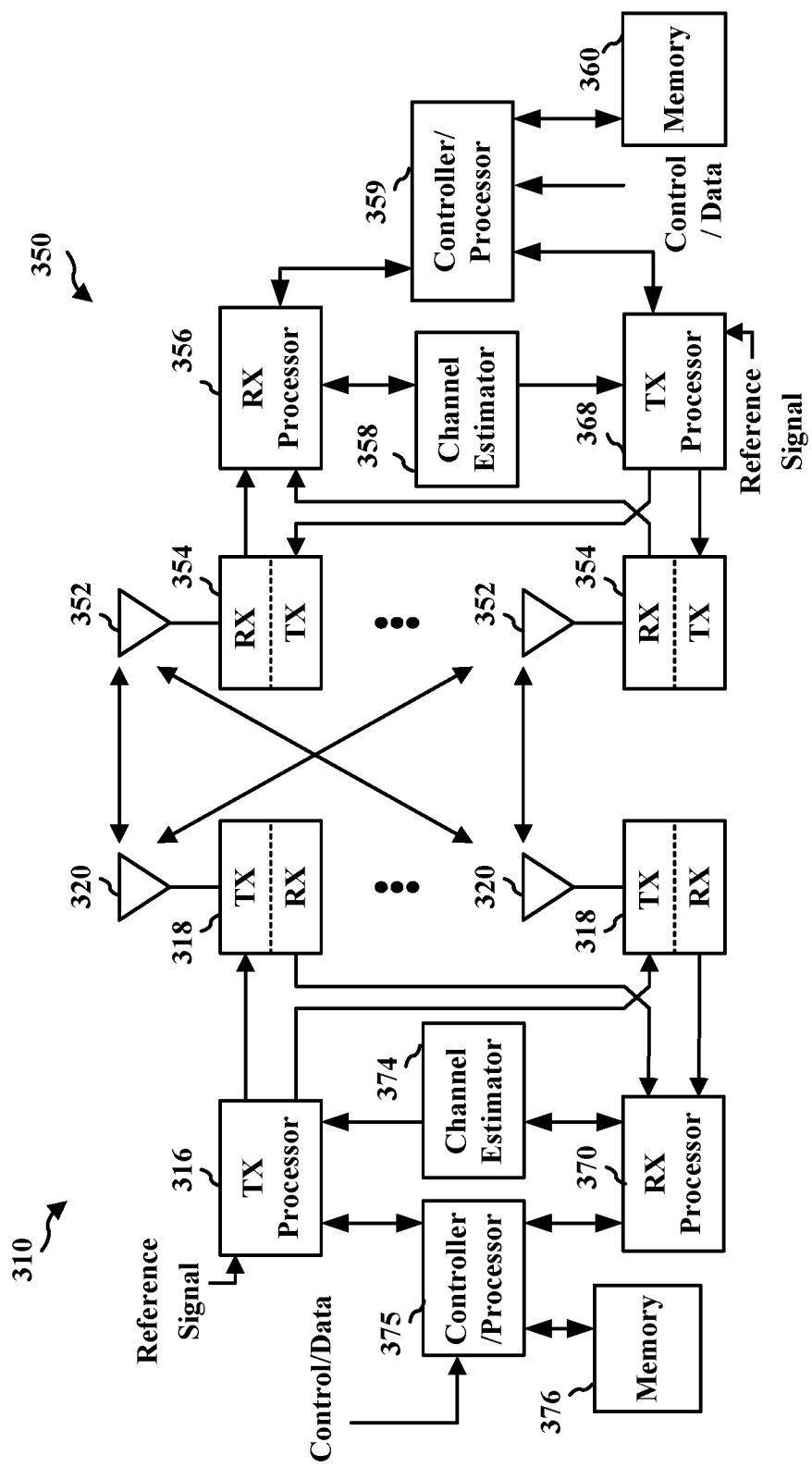
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with the OSI component 199 of FIG. 1.

In 5G NR, the system information other than the MIB and the SIB 1 (i.e., the OSI) (e.g., SIB 2-SIB 9) may be provided on an on-demand basis based on an RRC configuration provided in SIB 1 (the si-BroadcastStatus status). This means to obtain the OSI (e.g., SIB 2-SIB 9), a UE may first transmit a system information request, which may be a PRACH signal transmitted in a specific occasion. In response to the system information request, the base station may broadcast the OSI, which the UE may receive.

A small cell BS may be deployed to fill a network coverage gap or to enhance network coverage. As part of the self-optimized network (SON) operations, a small cell BS may use the network listen (NL) mechanism to sniff the neighboring BSs (which may be macro BSs or other small cell BSs) and acquire the system information broadcast by the neighboring BSs.

Unlike a UE, a 5G NR small cell BS may be able to acquire the MIB and the SIB 1 of neighboring cells but not the OSI because the OSI may be provided on an on-demand basis and conventionally a small cell BS may be unable to generate any uplink signal including the PRACH signal that may be used to trigger the broadcast of the OSI.

A small cell BS may be unable to perform SON operations in a macro BS overlay network unless it is able to acquire the complete system information including the OSI from the neighboring macro BSs. For plug-and-play home or small BSs, the complete system information including the OSI may be important for neighbor management, interference management, handovers, load balancing, and many other SON use cases. In other words, without acquiring the OSI details of the neighboring macro BSs, a small cell BS may have difficulty performing various SON functions in a 5G NR network.

Aspects relate to a special PRACH transmitter algorithm implemented at a BS (e.g., a small cell BS) for handling the transmission of the RACH signal for requesting the system information. As will be described in detail below, the special PRACH transmitter may be different in several aspects from the PRACH transmitter implemented at the UE. Based on the initial NL measurements, the BS with the special PRACH transmitter (which may be referred to as the first BS hereinafter) may transmit a PRACH preamble for requesting the OSI to a desired neighboring BS in order to acquire the OSI. Accordingly, the BS may be able to acquire the complete system information including the OSI from the neighboring macro BSs in order to perform SON operations in a macro BS overlay network.

Figure 4:
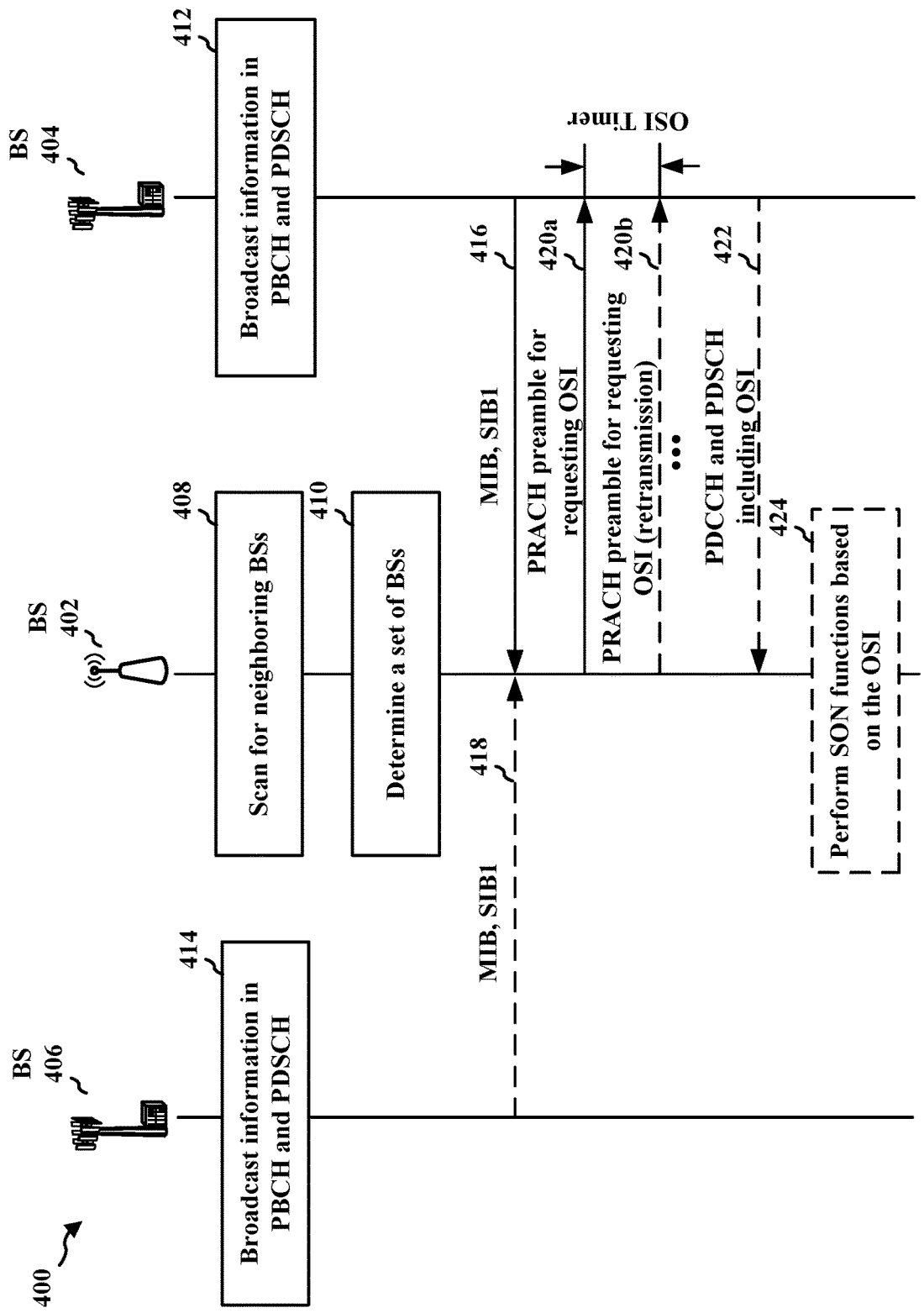
FIG. 4 is a diagram illustrating an example communication flow according to aspects.

FIG. 4 is a diagram illustrating an example communication flow 400 according to aspects. The BS 402 may correspond to the first BS, and may be a small cell 5G NR BS. BSs 404, 406 may be neighboring 5G NR BSs to the BS 402. In one aspect, one or both of BSs 404, 406 may be (a) macro BS(s). There may be additional neighboring BSs that are not shown in FIG. 4. Some of the additional neighboring BSs may operate similarly to the BS 406. At 412, 414, the BSs 404, 406 may each broadcast information in the PBCH and the PDSCH. The information broadcast at 412, 414 may include the respective MIB and the respective SIB 1. At 408, the BS 402 may scan for neighboring BSs. At 410, the BS 402 may determine, based on first quality metrics associated with the neighboring BSs, a set of BSs (e.g., BSs 404, 406). In particular, the set of BSs may include the BS 404. At 416, 418, the BS 402 may obtain a MIB and at least one SIB from each of the set of BSs (e.g., BSs 404, 406). At 420*a*, the BS 402 may transmit, to the BS 404, at least one PRACH preamble for requesting OSI. At 422, the BS 402 may receive, from the BS 404 in response to the transmitted at least one PRACH preamble, a PDCCH and an associated PDSCH. The PDSCH may include the OSI. At 424, the BS 402 may perform SON functions based on the OSI.

Figure 5:
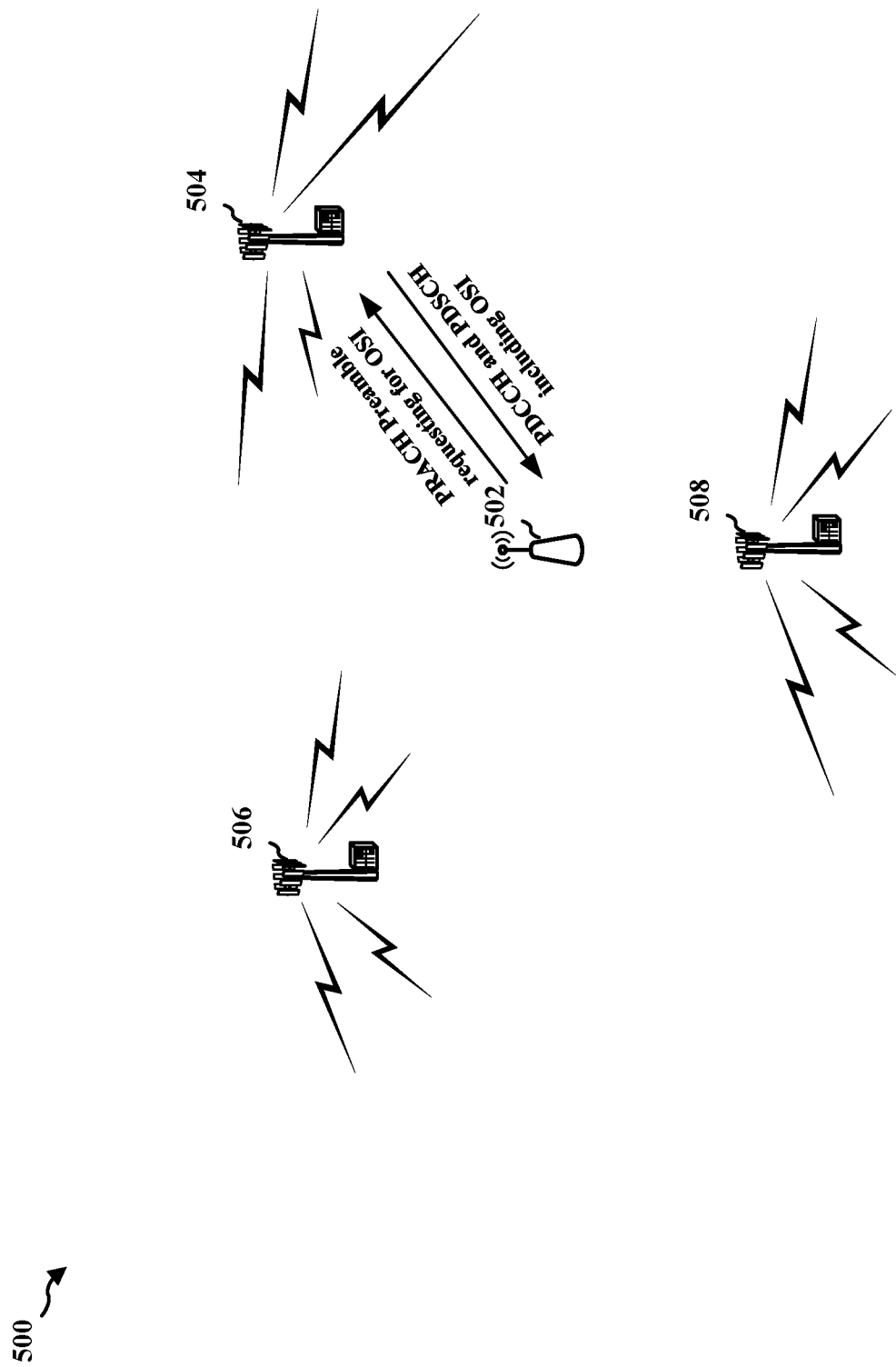
FIG. 5 is a diagram illustrating an example environment in which aspects may be practiced.

FIG. 5 is a diagram 500 illustrating an example environment in which aspects may be practiced. The BS 502 may be the first BS, and may correspond to the BS 402 in FIG. 4. Three neighboring BSs 504, 506, 508 are illustrated in FIG. 5. In particular, the BS 504 may correspond to the BS 404 in FIG. 4. Each of the BSs 506, 508 may correspond to the BS 406. Of course, additional neighboring BSs not shown in FIG. 5 may be present. Some of the additional neighboring BSs may operate similarly to the BS 406. The BS 502 may transmit, to the BS 504, at least one PRACH preamble for requesting OSI. The BS 502 may receive, from the BS 504 in response to the transmitted at least one PRACH preamble, a PDCCH and an associated PDSCH. The PDSCH may include the OSI.

In particular, at 408, the BS 402/502 may perform an NL scan of the neighboring cells (e.g., cells of the BSs 404/504, 406, 506, 508), and may obtain and store, for each of the neighboring BSs, a first quality metric, a PCI, and an NR absolute radio frequency channel number (NR-ARFCN). The first quality metric may be one or more of a received signal strength indicator (RSSI), a signal to noise ratio (SNR), a signal to interference plus noise ratio (SINR), a reference signal received power (RSRP), or a reference signal received quality (RSRQ). The BS 402/502 may determine the PCI of a BS/cell based on the PSS and the SSS of the B S/cell.

At 410, the BS 402/502 may determine the set of BSs by shortlisting some of the neighboring BSs/cells (e.g., the BSs 404, 406) based on the first quality metric. As described above, the first quality metric may be one or more of an RSSI, an SNR, an SINR, an RSRP, or an RSRQ. In general, the BS 402/502 may shortlist those neighboring BSs/cells that are associated with stronger signals or signals with better qualities. Therefore, in one aspect, the BS 402/502 may shortlist those neighboring BSs/cells whose first quality metric may be above a predetermined threshold.

At 416, 418, the BS 402/502 may obtain the MIB and the SIB 1 from each of the shortlisted BSs (e.g., the BSs 404, 406) using the NL scan. The MIB and the SIB 1 may be obtained based on the respective NR-ARFCN and the respective PCI. Subsequently, the BS 402/502 may extract the information from the SIB 1. The BS 402/502 may then select a second BS (e.g., the BS 404/504) based on a second quality metric. The second quality metric may be one or more of an RSRP, an RSRQ, an SNR, or an SINR. In one aspect, selecting the second BS based on the second quality metric may allow the BS 402/502 to select the neighboring BS associated with the strongest signal or the signal with the best quality as the second BS.

At 420*a*, the BS 402/502 may transmit a PRACH preamble associated with the SI-RNTI of the BS 404/504 (i.e., the second BS) to the BS 404/504 (i.e., the second BS) to request the OSI from the BS 404/504 (i.e., the second BS). The BS 402/502 may obtain the SI-RNTI of the BS 404/504 (i.e., the second BS) based on the SIB 1 from the BS 404/504 (i.e., the second BS).

At 422, the BS 402/502 may receive from the BS 404/504 a PDCCH and an associated PDSCH, where the PDSCH may include the OSI. In particular, the BS 402/502 may utilize the SI-RNTI to decode (e.g., unscramble) the PDCCH (The cyclic redundancy check "CRC" parity bits of the PDCCH may be scrambled with the SI-RNTI), and may utilize the decoded PDCCH to decode the associated PDSCH in order to retrieve the OSI.

An OSI timer may be implemented at the BS 402/502. The OSI timer may be set or reset every time the BS 402/502 may transmit the PRACH preamble for requesting the OSI. If the BS 402/502 fails to obtain the OSI upon the expiration of the OSI timer, the BS 402/502 may perform one of a number of possible operations. The BS 402/502 may fail to obtain the OSI when the BS 402/502 fails to receive either the PDCCH or the PDSCH, or when the BS 402/502 is unable to decode the PDSCH using the PDCCH to obtain the OSI. Because unlike a UE, the BS 402/502 is not attempting to obtain uplink allocation here, a simple fixed timer, rather than random backoff, may be used to control retransmission.

In one aspect, if the BS 402/502 fails to obtain the OSI upon the expiration of the OSI timer, the BS 402/502 may retransmit, e.g., at 420*b*, etc., another PRACH preamble for requesting the OSI to the same second BS. In one aspect, the BS 402/502 may retransmit the PRACH preamble at a same power as the previous transmission. Retransmitting the PRACH preamble at the same power may simplify the design of the system. In another aspect, the BS 402/502 may increase the transmit power (e.g., power ramping) by a factor (e.g., a ramping factor) at each subsequent retransmission. In case the failure to obtain the OSI was due to an insufficient transmit power level, power ramping may help to find the just appropriate transmit power level that would enable the second BS to receive the PRACH preamble and is not unnecessarily high either. The transmit power may be more liberally used in a BS because power is not as much of a limiting factor as would be in a UE.

In one aspect, if the BS 402/502 fails to obtain the OSI upon the expiration of the OSI timer after having transmitted the PRACH preamble to a second BS a predetermined number of times, the BS 402/502 may abandon the attempts to obtain the OSI from this second BS. The failure to obtain the OSI may have a number of different possible causes. Abandoning the attempts after the BS 402/502 has transmitted the PRACH preamble a predetermined number of times may prevent the BS 402/502 from being stuck in the futile attempts for an indefinite period of time. In one aspect, the BS 402/502 may then select a new second BS from the shortlisted set of BSs, and may transmit a PRACH preamble to the new second BS in order to obtain the OSI from the new second BS. In another aspect, the BS 402/502 may abandon the attempt to obtain the OSI altogether and may cease transmitting the PRACH preamble.

Figure 6:
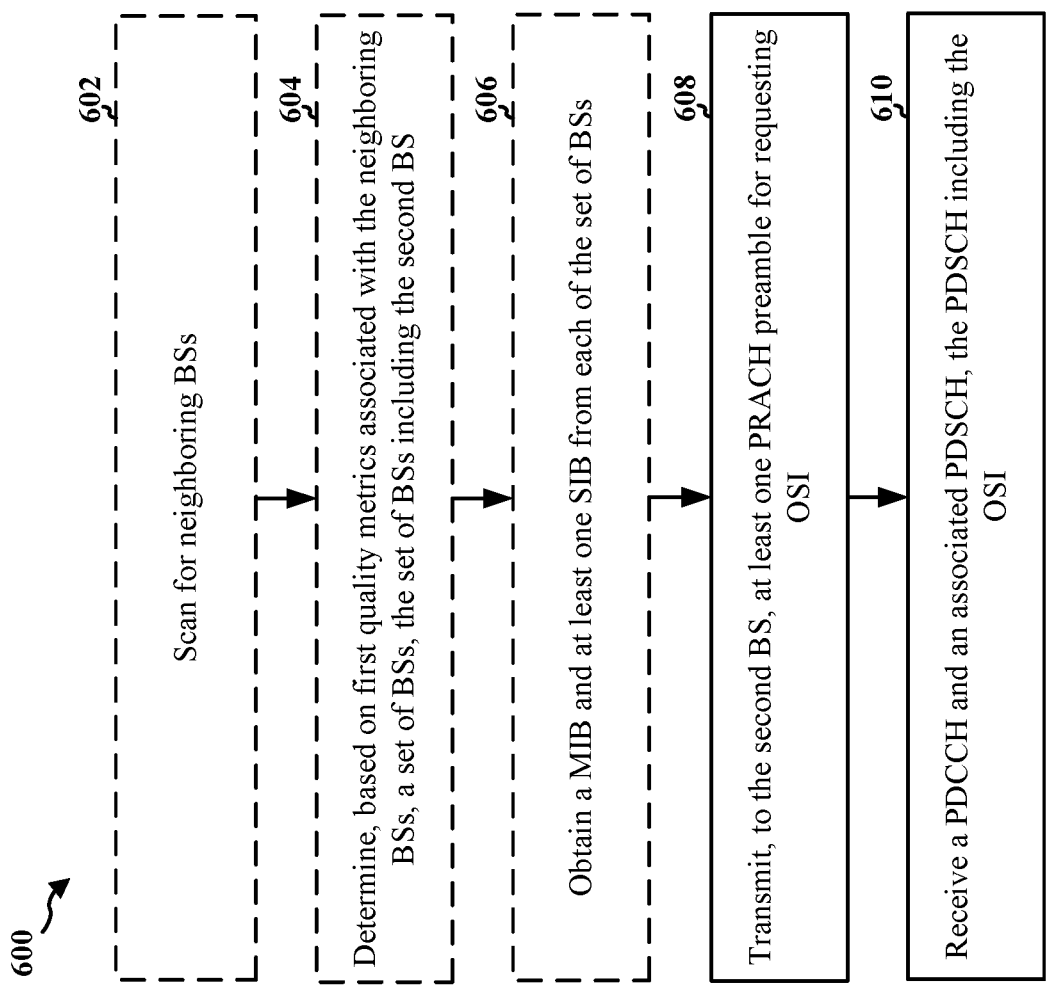
FIG. 6 is a flowchart of a method of wireless communication.

FIG. 6 is a flowchart 600 of a method of wireless communication. The method may be performed by a base station (e.g., the base station 102/180/402/502; the apparatus 702). In particular, the method may be performed by a first BS. At 608, the first BS may transmit, to the second BS (e.g., the BS 404/504), at least one PRACH preamble for requesting OSI. For example, 608 may be performed by the PRACH component 746 in FIG. 7. For example, FIG. 4 illustrates at 420*a* the BS 402 transmitting a PRACH preamble for requesting OSI to the BS 404.

At 610, the first BS may receive, from the second BS (e.g., the BS 404/504) in response to the transmitted at least one PRACH preamble, a PDCCH and an associated PDSCH, the PDSCH including the OSI. For example, 610 may be performed by the OSI component 748 in FIG. 7. For example, FIG. 4 illustrates at 422 the BS 402 receiving from the BS 404 a PDCCH and an associated PDSCH, the PDSCH including the OSI.

The at least one PRACH preamble may be associated with a SI-RNTI. For example, the BS 402 may transmit a PRACH preamble associated with the SI-RNTI of the BS 404 for requesting OSI to the BS 404. The receiving may include decoding the OSI based on the SI-RNTI. For example, the BS 402 may utilize the SI-RNTI to decode the received PDCCH, and may utilize the decoded PDCCH to decode the associated PDSCH in order to retrieve the OSI.

At 602, the first BS may scan for neighboring BSs. For example, 602 may be performed by the scan component 740 in FIG. 7. For example, FIG. 4 illustrates at 408 the BS 402 performing an NL scan of neighboring BSs. At 604, the first BS may determine, based on first quality metrics associated with the neighboring BSs, a set of BSs, the set of BSs including the second BS (e.g., the BS 404/504). For example, 604 may be performed by the BS set component 742 in FIG. 7. For example, FIG. 4 illustrates at 410 the BS 402 determining a set of BSs including the BS 404. At 606, the first BS may obtain a MIB and at least one SIB from each of the set of BSs. For example, 606 may be performed by the information component 744 in FIG. 7. For example, FIG. 4 illustrate at 416, 418 the BS 402 obtaining a MIB and a SIB 1 from the BSs 404, 406 using the NL scan. The at least one PRACH preamble may be transmitted to the second BS based on the obtained MIB and the at least one SIB from the second BS. The at least one SIB may include a SIB 1.

The scanning for neighboring BSs may include determining at least one of an RSSI, an SNR, an SINR, an RSRP, or an RSRQ. For example, the BS 402 may perform an NL scan of the neighboring BSs (e.g., the BSs 404, 406) to obtain and store, for each of the neighboring BSs, at least one of an RSSI, an SNR, an SINR, an RSRP, or an RSRQ.

The set of BSs may be determined based on the first quality metrics including the determined at least one of the RSSI, the SNR, the SINR, the RSRP, or the RSRQ. For example, the BS 402 may shortlist some of the neighboring BSs, and the shortlisted set of BSs may include those neighboring BSs whose associated first quality metrics may be above predetermined thresholds.

Obtaining the MIB and the at least one SIB may include determining at least one of an RSRP, an RSRQ, an SNR, or an SINR. For example, the RSRP or the RSRQ may be determined using information obtained from the MIB and the at least one SIB.

After the MIB and the at least one SIB are obtained from each of the set of BSs at 606 and before 608, the second BS may be selected from the set of BSs based on second quality metrics including the determined at least one of the RSRP, the RSRQ, the SNR, or the SINR. For example, the BS 402 may select the BS with the highest RSRP, RSRQ, SNR, or SNR as the second BS (e.g., the BS 404).

The scanning for neighboring BSs may include determining at least an NR-ARFCN and a PCI, the PCI being derived from a PSS and an SSS. For example, the BS 402 may perform an NL scan of the neighboring BSs (e.g., the BSs 404, 406) to obtain, for each of the neighboring BSs, an NR-ARFCN, a PSS, and an SSS. The BS 402 may determine the PCI of a neighboring BS based on its PSS and SSS. The MIB and the at least one SIB may be obtained based on the determined NR-ARFCN and the determined PCI.

The OSI may include at least one SIB, the at least one SIB including a SIB x, where x>1. For example, the OSI may include SIB 2-SIB 9.

The first BS may set an OSI timer. For example, the BS 404 may set an OSI timer every time a PRACH preamble for requesting OSI is transmitted or retransmitted at 420a, 420b, etc. Each of the at least one PRACH preamble may be transmitted with a power based on whether the OSI timer has expired. For example, the BS 402 may set or reset the OSI timer every time the BS 402 may transmit the PRACH preamble for requesting the OSI. If the BS 402 fails to obtain the OSI upon the expiration of the OSI timer, the BS 402 may perform one of a number of possible operations, which may include a retransmission of the PRACH preamble for requesting the OSI with a power. The BS 402 may fail to obtain the OSI when the BS 402 fails to receive either the PDCCH or the PDSCH, or when the BS 402 is unable to decode the PDSCH using the PDCCH to obtain the OSI.

In particular, the first BS may transmit, in a first transmission with a first power, a first PRACH preamble of the at least one PRACH preamble. The first BS may transmit, in a second transmission with a second power, a second PRACH preamble of the at least one PRACH preamble, the second PRACH preamble being transmitted upon expiration of the OSI timer without receiving the PDCCH or the associated PDSCH including the OSI from the second BS or without successfully decoding the associated PDSCH including the OSI after receiving the PDCCH from the second BS in response to the transmitted first PRACH preamble, the second power being greater than or equal to the first power. In other words, for example, the BS 402 may transmit at 420a a PRACH preamble for requesting the OSI to the BS 404. The BS 402 may then retransmit, e.g., at 420b, etc., another PRACH preamble for requesting the OSI to the same second BS 404 at an increased transmit power upon failing to obtain the OSI at the expiration of the OSI timer set or reset at the previous transmission or retransmission. The transmit power may be increased (e.g., power ramping) by a factor (e.g., a ramping factor) at each subsequent retransmission 420b, etc.

Further, the first BS may transmit, in one or more subsequent transmissions each with a respective power, subsequent PRACH preambles of the at least one PRACH preamble, each subsequent PRACH preamble being transmitted upon expiration of the OSI timer without receiving the PDCCH or the associated PDSCH including the OSI from the second BS or without successfully decoding the associated PDSCH including the OSI after receiving the PDCCH from the second BS in response to a previous transmitted PRACH preamble, each subsequent transmission being associated with a power that is greater than or equal to a power associated with its previous transmission. The first BS may cease further transmissions of PRACH preambles to the second BS upon a predetermined quantity of transmissions having occurred without receiving the PDCCH or the associated PDSCH including the OSI from the second BS or without successfully decoding the associated PDSCH including the OSI after receiving the PDCCH from the second BS in response to the transmitted PRACH preambles. In other words, for example, if the BS 402 fails to obtain the OSI upon the expiration of the OSI timer after having transmitted the PRACH preambles to the BS 404 a predetermined number of times where each retransmission may be performed with an increased transmit power, the BS 402 may abandon the attempts to obtain the OSI from this second BS 404, and may cease further transmissions of PRACH preambles to the BS 404.

Figure 7:
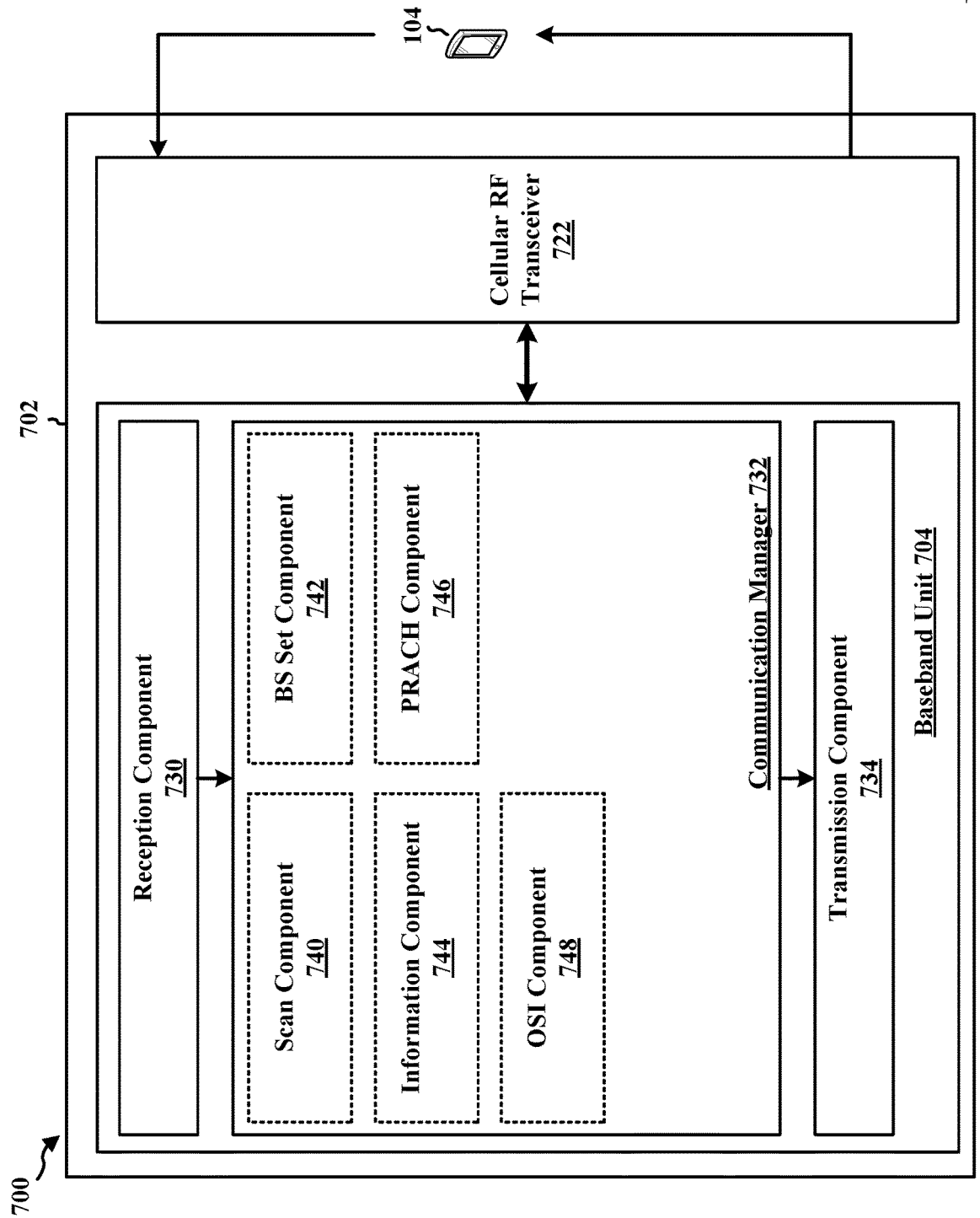
FIG. 7 is a diagram illustrating an example of a hardware implementation for an example apparatus.

FIG. 7 is a diagram 700 illustrating an example of a hardware implementation for an apparatus 702. The apparatus 702 is a BS and includes a baseband unit 704. The baseband unit 704 may communicate through a cellular RF transceiver 722 with the UE 104. The baseband unit 704 may include a computer-readable medium/memory. The baseband unit 704 is responsible for general processing, including the execution of software stored on the computer-readable medium/memory. The software, when executed by the baseband unit 704, causes the baseband unit 704 to perform the various functions described supra. The computer-readable medium/memory may also be used for storing data that is manipulated by the baseband unit 704 when executing software. The baseband unit 704 further includes a reception component 730, a communication manager 732, and a transmission component 734. The communication manager 732 includes the one or more illustrated components. The components within the communication manager 732 may be stored in the computer-readable medium/memory and/or configured as hardware within the baseband unit 704. The baseband unit 704 may be a component of the BS 310 and may include the memory 376 and/or at least one of the TX processor 316, the RX processor 370, and the controller/processor 375.

The communication manager 732 includes a scan component 740 that may be configured to scan for neighboring BSs, e.g., as described in connection with 602. The communication manager 732 further includes a BS set component 742 that may be configured to determine, based on first quality metrics associated with the neighboring BSs, a set of BSs, the set of BSs including the second BS, e.g., as described in connection with 604. The communication manager 732 further includes an information component 744 that may be configured to obtain a MIB and at least one SIB from each of the set of BSs, e.g., as described in connection with 606. The communication manager 732 further includes a PRACH component 746 that may be configured to transmit, to the second BS, at least one PRACH preamble for requesting OSI, e.g., as described in connection with 608. The communication manager 732 further includes an OSI component 748 that may be configured to receive a PDCCH and an associated PDSCH, the PDSCH including the OSI, e.g., as described in connection with 610.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the baseband unit 704, includes means for transmitting, to a second BS, at least one PRACH preamble for requesting OSI. In one configuration, the apparatus 702, and in particular the baseband unit 704, further includes means for receiving a PDCCH and an associated PDSCH, the PDSCH including the OSI.

In one configuration, the at least one PRACH preamble may be associated with a SI-RNTI, and the means for receiving may be configured to decode the OSI based on the received SI-RNTI. In one configuration, the apparatus 702, and in particular the baseband unit 704, further includes means for scanning for neighboring BSs. In one configuration, the apparatus 702, and in particular the baseband unit 704, further includes means for determining, based on first quality metrics associated with the neighboring BSs, a set of BSs, the set of BSs including the second BS. In one configuration, the apparatus 702, and in particular the baseband unit 704, further includes means for obtaining a MIB and at least one SIB from each of the set of BSs. In one configuration, the at least one PRACH preamble may be transmitted to the second BS based on the obtained MIB and the at least one SIB from the second BS. In one configuration, the at least one SIB may include a SIB 1. In one configuration, the means for scanning for neighboring BSs may be configured to determine at least one of an RSSI, an SNR, an SINR, an RSRP, or an RSRQ. In one configuration, the set of BSs may be determined based on the first quality metrics including the determined at least one of the RSSI, the SNR, the SINR, the RSRP, or the RSRQ. In one configuration, the means for obtaining the MIB and the at least one SIB may be configured to determine at least one of an RSRP, an RSRQ, an SNR, or an SINR. In one configuration, the second BS may be selected from the set of BSs based on second quality metrics including the determined at least one of the RSRP, the RSRQ, the SNR, or the SINR. In configuration, the means for scanning for neighboring BSs may be configured to determine at least an NR-ARFCN and a PCI, the PCI being derived from a PSS and an SSS. In one configuration, the MIB and the at least one SIB may be obtained based on the determined NR-ARFCN and the determined PCI. In one configuration, the apparatus 702, and in particular the baseband unit 704, further includes means for setting an OSI timer. Each of the at least one PRACH preamble may be transmitted with a power based on whether the OSI timer has expired. In one configuration, the means for transmitting may be configured to transmit in a first transmission with a first power, a first PRACH preamble of the at least one PRACH preamble; and transmit, in a second transmission with a second power, a second PRACH preamble of the at least one PRACH preamble, the second PRACH preamble being transmitted upon expiration of the OSI timer without receiving the PDCCH or the associated PDSCH including the OSI from the second BS or without successfully decoding the associated PDSCH including the OSI after receiving the PDCCH from the second BS in response to the transmitted first PRACH preamble, the second power being greater than or equal to the first power. In one configuration, the means for transmitting may be further configured to transmit, in one or more subsequent transmissions each with a respective power, subsequent PRACH preambles of the at least one PRACH preamble, each subsequent PRACH preamble being transmitted upon expiration of the OSI timer without receiving the PDCCH or the associated PDSCH including the OSI from the second BS or without successfully decoding the associated PDSCH including the OSI after receiving the PDCCH from the second BS in response to a previous transmitted PRACH preamble, each subsequent transmission being associated with a power that is greater than or equal to a power associated with its previous transmission; and cease further transmissions of PRACH preambles to the second BS upon a predetermined quantity of transmissions having occurred without receiving the PDCCH or the associated PDSCH including the OSI from the second BS or without successfully decoding the associated PDSCH including the OSI after receiving the PDCCH from the second BS in response to the transmitted PRACH preambles.

The aforementioned means may be one or more of the aforementioned components of the apparatus 702 configured to perform the functions recited by the aforementioned means. As described supra, the apparatus 702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Aspects relate to a special PRACH transmitter implemented at a 5G NR BS. The BS may transmit a PRACH preamble to request on-demand OSI from a nearby 5G NR BS, and may then perform SON functions based on the OSI. Accordingly, the BS may avoid having to wait for an undefined period of time for a UE in the vicinity to request that the OSI be broadcast. Based on the cell quality, the BS may request the on-demand OSI in a periodic manner.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first BS, comprising: transmitting, to a second BS, at least one PRACH preamble for requesting OSI; and receiving a PDCCH and an associated PDSCH, the PDSCH including the OSI.

Aspect 2 is the method of aspect 1, where the at least one PRACH preamble is associated with a SI-RNTI, and the receiving includes decoding the OSI based on the received SI-RNTI.

Aspect 3 is the method of any of aspects 1 and 2, further including: scanning for neighboring BSs; determining, based on first quality metrics associated with the neighboring BSs, a set of BSs, the set of BSs including the second BS; and obtaining an MIB and at least one SIB from each of the set of BSs, where the at least one PRACH preamble is transmitted to the second BS based on the obtained MIB and the at least one SIB from the second BS.

Aspect 4 is the method of aspect 3, where the at least one SIB includes a SIB 1.

Aspect 5 is the method of any of aspects 3 and 4, where the scanning for neighboring BSs includes determining at least one of an RSSI, an SNR, an SINR, an RSRP, or an RSRQ.

Aspect 6 is the method of aspect 5, where the set of BSs is determined based on the first quality metrics including the determined at least one of the RSSI, the SNR, the SINR, the RSRP, or the RSRQ.

Aspect 7 is the method of any of aspects 3 to 6, where the obtaining the MIB and the at least one SIB includes determining at least one of an RSRP, an RSRQ, an SNR, or an SINR.

Aspect 8 is the method of aspect 7, where the second BS is selected from the set of BSs based on second quality metrics including the determined at least one of the RSRP, the RSRQ, the SNR, or the SINR.

Aspect 9 is the method of any of aspects 3 to 8, where the scanning for neighboring BSs includes determining at least an NR-ARFCN and a PCI, the PCI being derived from a PSS and an SSS.

Aspect 10 is the method of aspect 9, where the MIB and the at least one SIB are obtained based on the determined NR-ARFCN and the determined PCI.

Aspect 11 is the method of any of aspects 1 to 10, further including setting an OSI timer, where each of the at least one PRACH preamble is transmitted with a power based on whether the OSI timer has expired.

Aspect 12 is the method of aspect 11, where the transmitting includes: transmitting, in a first transmission with a first power, a first PRACH preamble of the at least one PRACH preamble; and transmitting, in a second transmission with a second power, a second PRACH preamble of the at least one PRACH preamble, the second PRACH preamble being transmitted upon expiration of the OSI timer without receiving the PDCCH or the associated PDSCH including the OSI from the second BS or without successfully decoding the associated PDSCH including the OSI after receiving the PDCCH from the second BS in response to the transmitted first PRACH preamble, the second power being greater than or equal to the first power.

Aspect 13 is the method of aspect 12, where the transmitting includes: transmitting, in one or more subsequent transmissions each with a respective power, subsequent PRACH preambles of the at least one PRACH preamble, each subsequent PRACH preamble being transmitted upon expiration of the OSI timer without receiving the PDCCH or the associated PDSCH including the OSI from the second BS or without successfully decoding the associated PDSCH including the OSI after receiving the PDCCH from the second BS in response to a previous transmitted PRACH preamble, each subsequent transmission being associated with a power that is greater than or equal to a power associated with its previous transmission, and ceasing further transmissions of PRACH preambles to the second BS upon a predetermined quantity of transmissions having occurred without receiving the PDCCH or the associated PDSCH including the OSI from the second BS or without successfully decoding the associated PDSCH including the OSI after receiving the PDCCH from the second BS in response to the transmitted PRACH preambles.

Aspect 14 is the method of any of aspects 1 to 13, where the OSI includes at least one SIB, the at least one SIB including a SIB x, where x>1.

Aspect 15 is an apparatus for wireless communication including at least one processor coupled to a memory and configured to implement a method as in any of aspects 1 to 14.

Aspect 16 is an apparatus for wireless communication including means for implementing a method as in any of aspects 1 to 14.

Aspect 17 is a computer-readable medium storing computer executable code, where the code when executed by a processor causes the processor to implement a method as in any of aspects 1 to 14.

The invention claimed is:

1. A method of wireless communication of a first base station (BS), comprising:
   scanning for neighboring BSs;
   determining, based on first quality metrics associated with the neighboring BSs, a set of BSs:
   transmitting, to a second BS in the set of BSs, at least one physical random access channel (PRACH) preamble for requesting other system information (OSI); and
   receiving a physical downlink control channel (PDCCH) and an associated physical downlink shared channel (PDSCH), the PDSCH including the OSI.

2. The method of claim 1, wherein the at least one PRACH preamble is associated with a system information (SI) radio network temporary identifier (RNTI) (SI-RNTI), and the receiving comprises decoding the OSI based on the SI-RNTI.

3. The method of claim 1, further comprising:
   obtaining a master information block (MIB) and at least one system information block (SIB) from each of the set of BSs,
   wherein the at least one PRACH preamble is transmitted to the second BS based on the obtained MIB and the at least one SIB from the second BS.

4. The method of claim 3, wherein the at least one SIB includes a SIB 1.

5. The method of claim 3, wherein the scanning for neighboring BSs comprises determining at least one of a received signal strength indicator (RSSI), a signal to noise ratio (SNR), a signal to interference plus noise ratio (SINR), a reference signal received power (RSRP), or a reference signal received quality (RSRQ).

6. The method of claim 5, wherein the set of BSs is determined based on the first quality metrics including the determined at least one of the RSSI, the SNR, the SINR, the RSRP, or the RSRQ.

7. The method of claim 3, wherein the obtaining the MIB and the at least one SIB comprises determining at least one of a reference signal received power (RSRP), a reference signal received quality (RSRQ), a signal to noise ratio (SNR), or a signal to interference plus noise ratio (SINR).

8. The method of claim 7, wherein the second BS is selected from the set of BSs based on second quality metrics including the determined at least one of the RSRP, the RSRQ, the SNR, or the SINR.

9. The method of claim 3, wherein the scanning for neighboring BSs comprises determining at least a new radio (NR) absolute radio frequency channel number (NR-ARFCN) and a physical cell identity (PCI), the PCI being derived from a primary synchronization signal (PSS) and a secondary synchronization signal (SSS).

10. The method of claim 9, wherein the MIB and the at least one SIB are obtained based on the determined NR-ARFCN and the determined PCI.

11. The method of claim 1, further comprising setting an OSI timer, wherein each of the at least one PRACH preamble is transmitted with a power based on whether the OSI timer has expired.

12. The method of claim 11, wherein the transmitting comprises:
transmitting, in a first transmission with a first power, a first PRACH preamble of the at least one PRACH preamble; and
transmitting, in a second transmission with a second power, a second PRACH preamble of the at least one PRACH preamble, the second PRACH preamble being transmitted upon expiration of the OSI timer without receiving the PDCCH or the associated PDSCH including the OSI from the second BS or without successfully decoding the associated PDSCH including the OSI after receiving the PDCCH from the second BS in response to the transmitted first PRACH preamble, the second power being greater than or equal to the first power.

13. The method of claim 12, wherein the transmitting comprises:
transmitting, in one or more subsequent transmissions each with a respective power, subsequent PRACH preambles of the at least one PRACH preamble, each subsequent PRACH preamble being transmitted upon expiration of the OSI timer without receiving the PDCCH or the associated PDSCH including the OSI from the second BS or without successfully decoding the associated PDSCH including the OSI after receiving the PDCCH from the second BS in response to a previous transmitted PRACH preamble, each subsequent transmission being associated with a power that is greater than or equal to a power associated with its previous transmission, and
ceasing further transmissions of PRACH preambles to the second BS upon a predetermined quantity of transmissions having occurred without receiving the PDCCH or the associated PDSCH including the OSI from the second BS or without successfully decoding the associated PDSCH including the OSI after receiving the PDCCH from the second BS in response to the transmitted PRACH preambles.

14. The method of claim 1, wherein the OSI comprises at least one system information block (SIB), the at least one SIB including a SIB x, where x>1.

15. An apparatus for wireless communication, the apparatus being a first base station, (BS), comprising:
a memory; and
at least one processor coupled to the memory and configured to cause the apparatus to:
scan for neighboring BSs;
determine, based on first quality metrics associated with the neighboring BSs, a set of BSs;
transmit, to a second BS in the set of BSs, at least one physical random access channel (PRACH) preamble for requesting other system information (OSI); and
receive a physical downlink control channel (PDCCH) and an associated physical downlink shared channel (PDSCH), the PDSCH including the OSI.

16. The apparatus of claim 15, wherein the at least one PRACH preamble is associated with a system information (SI) radio network temporary identifier (RNTI) (SI-RNTI), and the at least one processor is configured to receive by decoding the OSI based on the SI-RNTI.

17. The apparatus of claim 15, the at least one processor being further configured to:
obtain a master information block (MIB) and at least one system information block (SIB) from each of the set of BSs,
wherein the at least one PRACH preamble is transmitted to the second BS based on the obtained MIB and the at least one SIB from the second BS.

18. The apparatus of claim 17, wherein the at least one SIB includes a SIB 1.

19. The apparatus of claim 17, wherein to scan for neighboring BSs, the at least one processor is configured to determine at least one of a received signal strength indicator (RSSI), a signal to noise ratio (SNR), a signal to interference plus noise ratio (SINR), a reference signal received power (RSRP), or a reference signal received quality (RSRQ).

20. The apparatus of claim 19, wherein the set of BSs is determined based on the first quality metrics including the determined at least one of the RSSI, the SNR, the SINR, the RSRP, the RSRQ.

21. The apparatus of claim 17, wherein to obtain the MIB and the at least one SIB, the at least one processor is configured to determine at least one of a reference signal received power (RSRP), a reference signal received quality (RSRQ), a signal to noise ratio (SNR), or a signal to interference plus noise ratio (SINR).

22. The apparatus of claim 21, wherein the second BS is selected from the set of BSs based on second quality metrics including the determined at least one the RSRP, the RSRQ, the SNR, or the SINR.

23. The apparatus of claim 17, wherein to scan for neighboring BSs, the at least one processor is configured to determine at least a new radio (NR) absolute radio frequency channel number (NR-ARFCN) and a physical cell identity (PCI), the PCI being derived from a primary synchronization signal (PSS) and a secondary synchronization signal (SSS).

24. The apparatus of claim 23, wherein the MIB and the at least one SIB are obtained based on the determined NR-ARFCN and the determined PCI.

25. The apparatus of claim 15, the at least one processor being further configured to set an OSI timer, wherein each of the at least one PRACH preamble is transmitted with a power based on whether the OSI timer has expired.

26. The apparatus of claim 25, wherein to transmit the at least one PRACH preamble for requesting OSI, the at least one processor is configured to:
  transmit, in a first transmission with a first power, a first PRACH preamble of the at least one PRACH preamble; and
  transmit, in a second transmission with a second power, a second PRACH preamble of the at least one PRACH preamble, the second PRACH preamble being transmitted upon expiration of the OSI timer without receiving the PDCCH or the associated PDSCH including the OSI from the second BS or without successfully decoding the associated PDSCH including the OSI after receiving the PDCCH from the second BS in response to the transmitted first PRACH preamble, the second power being greater than or equal to the first power.

27. The apparatus of claim 26, wherein to transmit the at least one PRACH preamble for requesting OSI, the at least one processor is configured to:
  transmit, in one or more subsequent transmissions each with a respective power, subsequent PRACH preambles of the at least one PRACH preamble, each subsequent PRACH preamble being transmitted upon expiration of the OSI timer without receiving the PDCCH or the associated PDSCH including the OSI from the second BS or without successfully decoding the associated PDSCH including the OSI after receiving the PDCCH from the second BS in response to a previous transmitted PRACH preamble, each subsequent transmission being associated with a power that is greater than or equal to a power associated with its previous transmission, and
  cease further transmissions of PRACH preambles to the second BS upon a predetermined quantity of transmissions having occurred without receiving the PDCCH or the associated PDSCH including the OSI from the second BS or without successfully decoding the associated PDSCH including the OSI after receiving the PDCCH from the second BS in response to the transmitted PRACH preambles.

28. The apparatus of claim 15, wherein the OSI comprises at least one system information block (SIB), the at least one SIB including a SIB x, where x>1.

29. An apparatus for wireless communication, the apparatus being a first base station (BS), comprising:
  means for scanning for neighboring BSs;
  means for determining, based on first quality metrics associated with the neighboring BSs, a set of BSs;
  means for transmitting, to a second BS in the set of BSs, at least one physical random access channel (PRACH) preamble for requesting other system information (OSI); and
  means for receiving a physical downlink control channel (PDCCH) and an associated physical downlink shared channel (PDSCH), the PDSCH including the OSI.

30. A non-transitory computer-readable medium storing computer executable code, the code when executed by a processor of a first base station (BS) causes the processor to:
  scan for neighboring BSs;
  determine, based on first quality metrics associated with the neighboring BSs, a set of BSs;
  transmit, to a second BS in the set of BSs, at least one physical random access channel (PRACH) preamble for requesting other system information (OSI); and
  receive a physical downlink control channel (PDCCH) and an associated physical downlink shared channel (PDSCH), the PDSCH including the OSI.

\* \* \* \* \*